United States Patent
Jeon et al.

(10) Patent No.: US 11,621,423 B2
(45) Date of Patent: *Apr. 4, 2023

(54) ADDITIVE FOR CATHODE, METHOD FOR PREPARING THE SAME, CATHODE INCLUDING THE SAME, AND LITHIUM SECONDARY BATTERY INCLUDING THE SAME

(71) Applicant: LG Chem, Ltd., Seoul (KR)

(72) Inventors: Hyelim Jeon, Daejeon (KR); Donghun Lee, Daejeon (KR); Sang Wook Lee, Daejeon (KR); Eunsol Lho, Daejeon (KR); Wang Mo Jung, Daejeon (KR); Minsuk Kang, Daejeon (KR); Sora Baek, Daejeon (KR)

(73) Assignee: LG Energy Solution, Ltd.

( * ) Notice: Subject to any disclaimer, the term of this patent is extended or adjusted under 35 U.S.C. 154(b) by 461 days.

This patent is subject to a terminal disclaimer.

(21) Appl. No.: 16/638,188

(22) PCT Filed: Nov. 22, 2018

(86) PCT No.: PCT/KR2018/014456
§ 371 (c)(1),
(2) Date: Feb. 11, 2020

(87) PCT Pub. No.: WO2019/107835
PCT Pub. Date: Jun. 6, 2019

(65) Prior Publication Data
US 2020/0365904 A1    Nov. 19, 2020

(30) Foreign Application Priority Data

Nov. 29, 2017  (KR) .................. 10-2017-0161943
Nov. 21, 2018  (KR) .................. 10-2018-0144887

(51) Int. Cl.
$H01M\ 4/62$ (2006.01)
$H01M\ 4/525$ (2010.01)
(Continued)

(52) U.S. Cl.
CPC ........... *H01M 4/628* (2013.01); *H01M 4/505* (2013.01); *H01M 4/525* (2013.01); *H01M 10/0525* (2013.01); *H01M 2004/028* (2013.01)

(58) Field of Classification Search
CPC ...... H01M 4/364; H01M 4/525; H01M 4/628; H01M 2004/028
See application file for complete search history.

(56) References Cited

U.S. PATENT DOCUMENTS 5,378,560 A    1/1995  Tomiyama
10,930,935 B2 *  2/2021  Jeon .................. H01M 4/364
(Continued)

FOREIGN PATENT DOCUMENTS

EP    2270901 A1    1/2011
JP    2004079386 A    3/2004
(Continued)

OTHER PUBLICATIONS

Extended European Search Report for Application No. 18883514.4 dated Sep. 25, 2020, 5 pages.
(Continued)

*Primary Examiner* — Brittany L Raymond
(74) *Attorney, Agent, or Firm* — Lerner, David, Littenberg, Krumholz & Mentlik, LLP

(57) ABSTRACT

The present disclosure relates to a cathode additive of a lithium secondary battery, and a method for preparing the same. The cathode additive exhibits high irreversible capacity, and may be effectively applied to a battery using an anode material having high energy density. In one embodi-
(Continued)

ment, the cathode additive includes a compound represented by the following Chemical Formula 1:

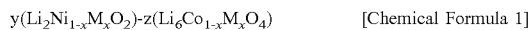

$y(Li_2Ni_{1-x}M_xO_2)\text{-}z(Li_6Co_{1-x}M_xO_4)$ [Chemical Formula 1]

14 Claims, 6 Drawing Sheets

(51) Int. Cl.
*H01M 10/0525* (2010.01)
*H01M 4/02* (2006.01)
*H01M 4/505* (2010.01)

(56) References Cited

U.S. PATENT DOCUMENTS

| | | |
|---|---|---|
| 2004/0157124 A1 | 8/2004 | Goh et al. |
| 2005/0118496 A1 | 6/2005 | Chang et al. |
| 2010/0203386 A1 | 8/2010 | Chang et al. |
| 2013/0011727 A1 | 1/2013 | Chang et al. |
| 2013/0171524 A1 | 7/2013 | Cho et al. |
| 2014/0205898 A1 | 7/2014 | Lee et al. |
| 2014/0315078 A1 | 10/2014 | Chang et al. |
| 2015/0270544 A1* | 9/2015 | Yoshida ............... H01M 4/525 252/182.1 |
| 2015/0340692 A1* | 11/2015 | Park ..................... H01M 4/386 429/223 |
| 2015/0372304 A1* | 12/2015 | Hasegawa ............ H01M 4/131 429/231.95 |
| 2018/0013129 A1* | 1/2018 | Lee ....................... H01M 50/20 |

FOREIGN PATENT DOCUMENTS

| | | | |
|---|---|---|---|
| JP | 2005521220 A | 7/2005 | |
| JP | 2006514776 A | 5/2006 | |
| JP | 2008226643 A | 9/2008 | |
| JP | 2013065467 A | 4/2013 | |
| JP | 2015138730 A | 7/2015 | |
| KR | 20050030588 A | 3/2005 | |
| KR | 20130079109 A | 7/2013 | |
| KR | 20140093529 A | 7/2014 | |
| WO | 2014118834 A1 | 8/2014 | |
| WO | 2015034257 A1 | 3/2015 | |

OTHER PUBLICATIONS

Lee et al, "Li 2 NiO 2 as a Novel Cathode Additive for Overdischarge Protection of Li-Ion Batteries," Chemistry of Materials, Jan. 1, 2008, pp. 5-7, vol. 20, No. I, XP055104544.

Noh et al, "Role of Li 6 CoO 4 Cathode Additive in Li-Ion Cells Containing Low Coulombic Efficiency Anode Material", Journal of the Electrochemical Society, Jan. 1, 2012, pp. 1329-1334, vol. 159, No. 8, XP055342824.

Zhao, E. et al.," High-capacity lithium-rich cathode oxides with multivalent cationic and anionic redox reactions for lithium ion batteries" Science China.Chemistry, Springer Nature, Oct. 2017, pp. 1-11, vol. 60.

Search Report dated Jul. 18, 2022 from the Office Action for Chinese Application No. 201880052824.x dated Jul. 25, 2022, pp. 1-3.

International Search Report for Application No. PCT/KR2018/014456 dated Mar. 6, 2019.

Kim, Min Gyu et al., "Air stable Al2O3-coated Li2NiO2 cathode additive as a surplus current consumer in a Li-ion cell", Journal of materials chemistry, Received Aug. 14, 2008, vol. 18, No. 48, pp. 5880-5887.

Noh, Mijung et al., "Role of Li6CoO4 Cathode Additive in Li-Ion Cells Containing Low Coulombic Efficiency Anode Material", Journal of The Electrochemical Society, Published Jul. 20, 2012, vol. 159, No. 8, pp. A1329-A1334.

* cited by examiner

[FIG. 1]
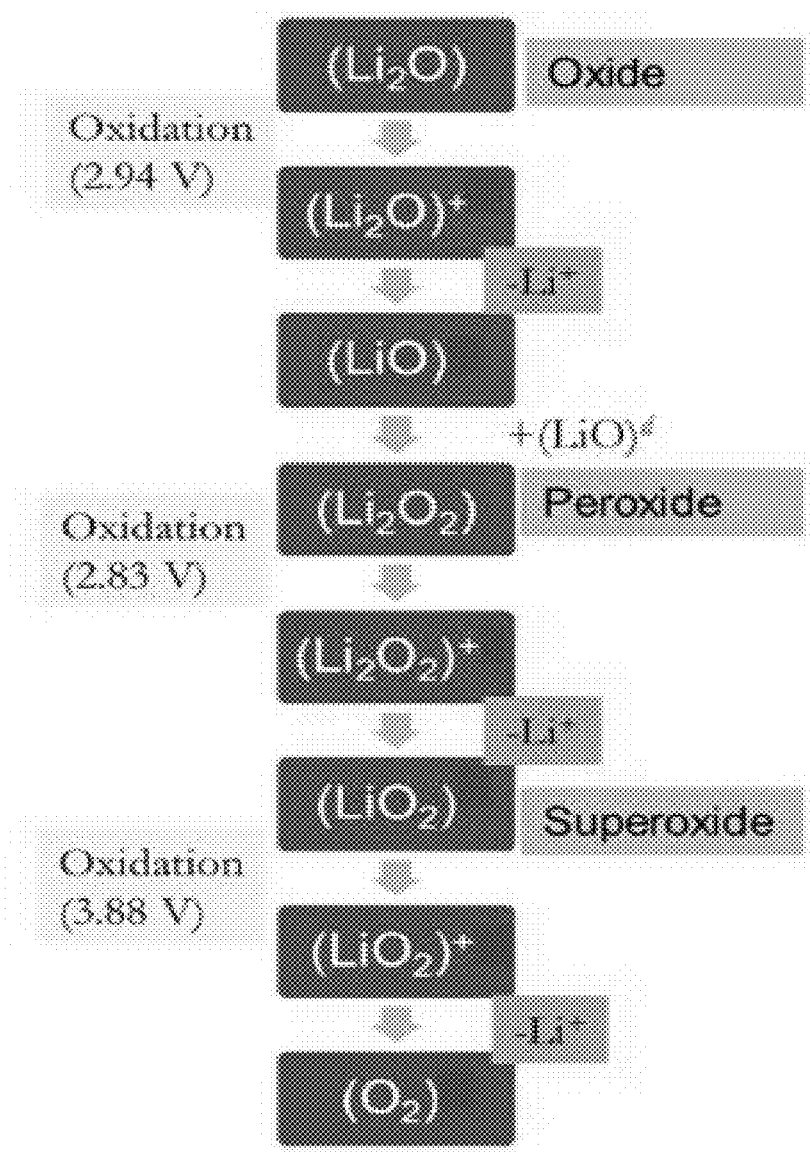

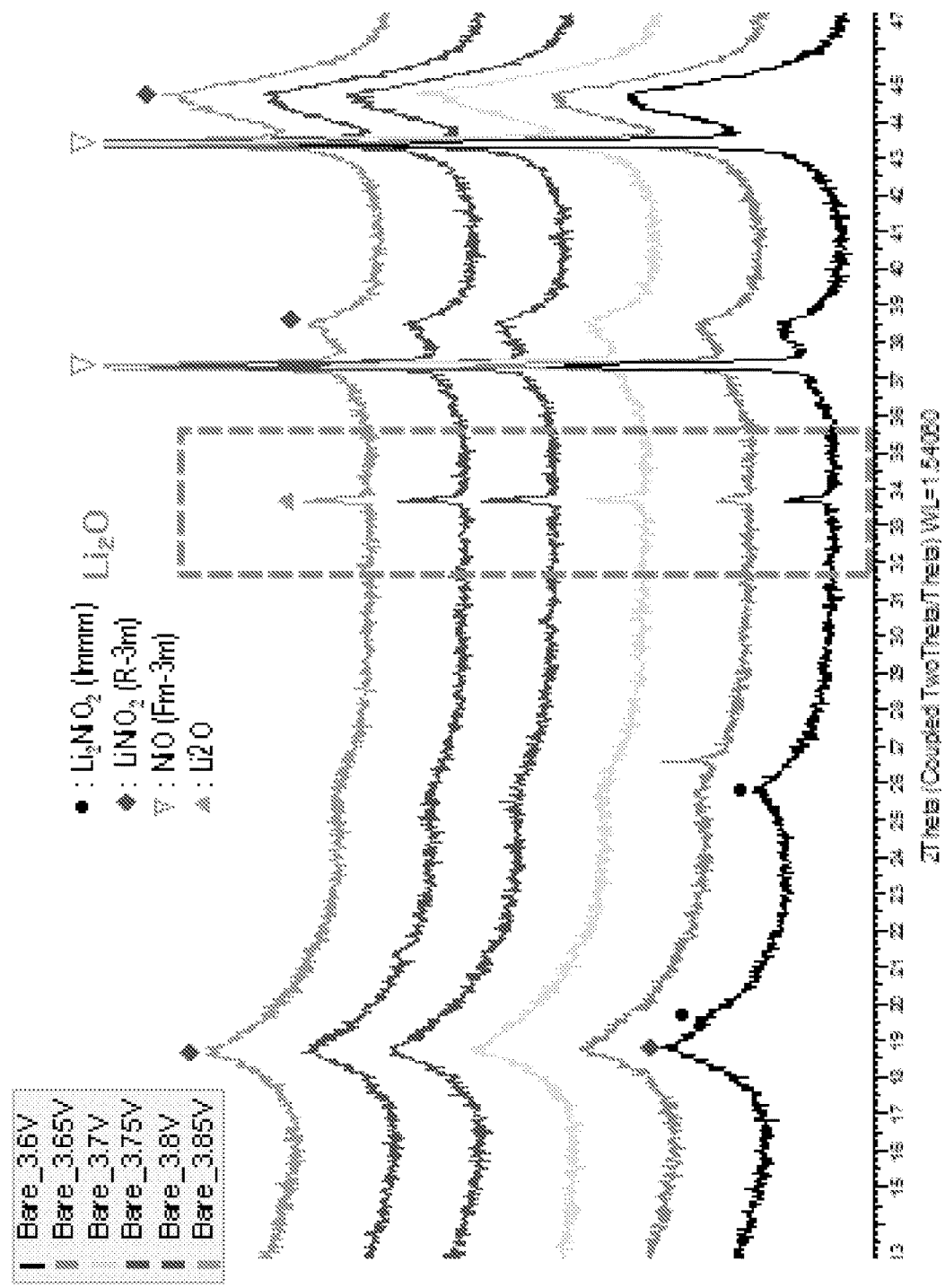
[FIG.2]

[FIG. 3]
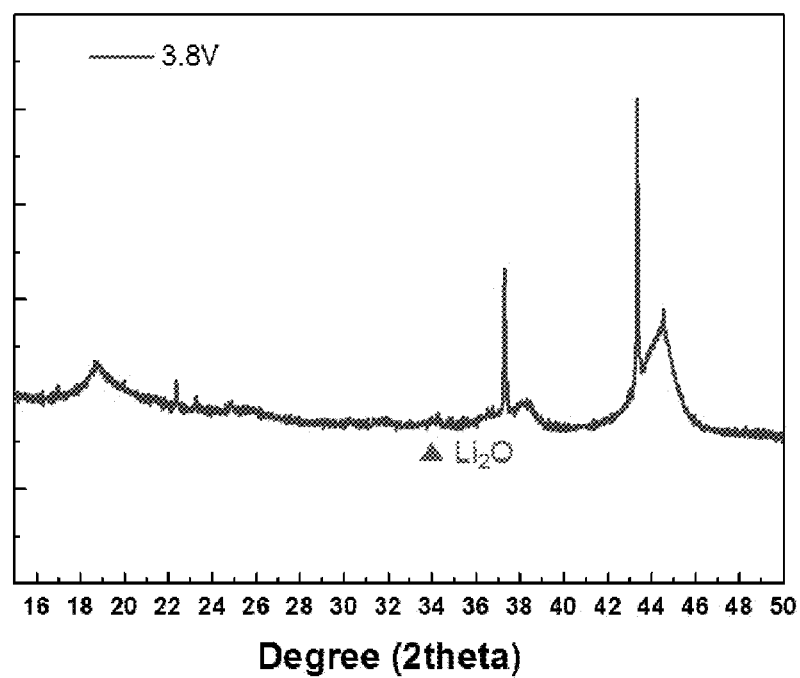

[FIG. 4]
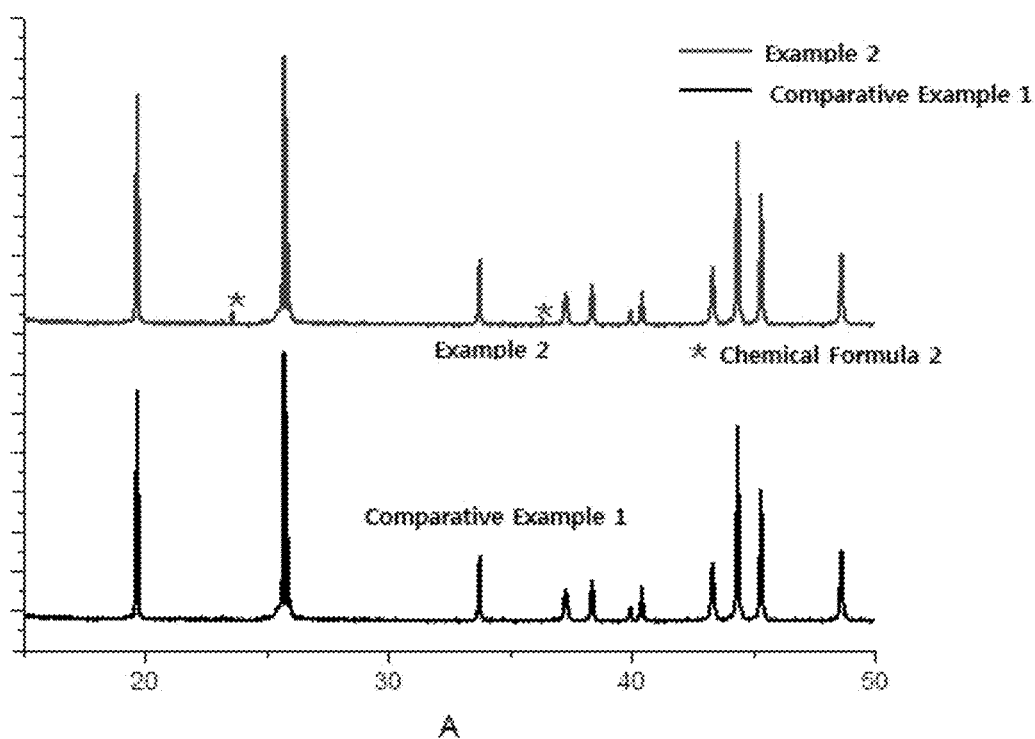

[FIG. 5]
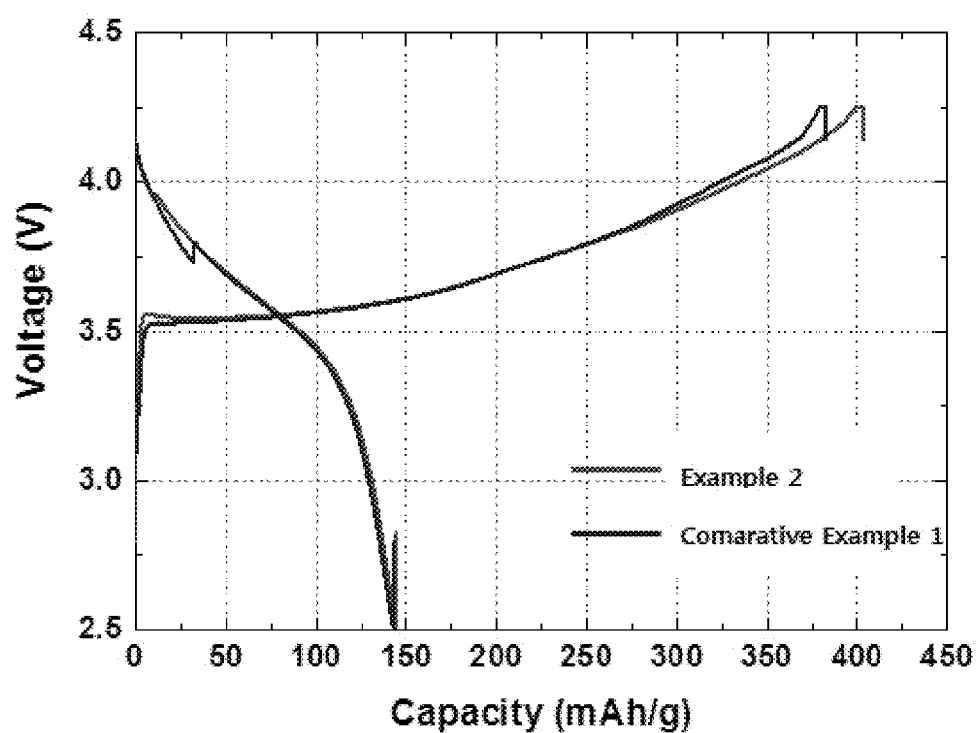

[FIG. 6]
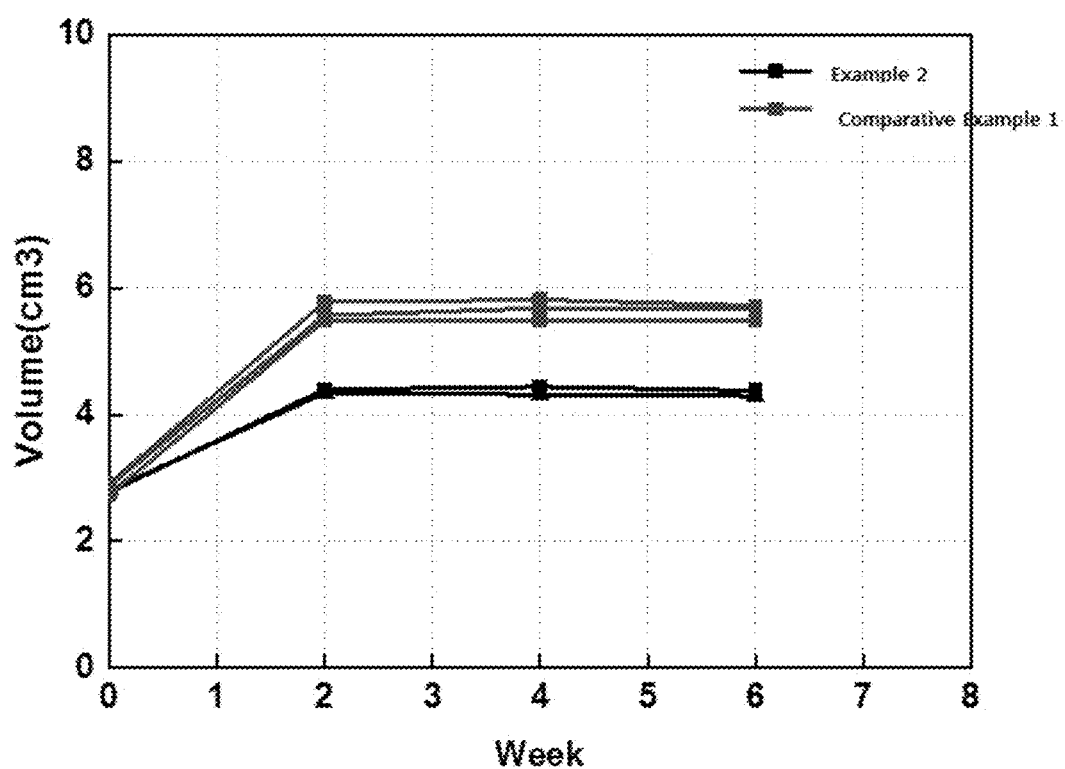

ADDITIVE FOR CATHODE, METHOD FOR PREPARING THE SAME, CATHODE INCLUDING THE SAME, AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2018/014456 filed Nov. 22, 2018, the disclosure of which is incorporated herein in its entirety by reference, which claims priority to and the benefit of Korean Patent Applications No. 10-2017-0161943 filed on Nov. 29, 2017 and No. 10-2018-0144887 filed on Nov. 21, 2018 with the Korean Intellectual Property Office, the disclosures of which are incorporated herein by reference in their entirety.

TECHNICAL FIELD

The present disclosure relates to a cathode additive of a lithium secondary battery, a method for preparing the same, a cathode including the same, and a lithium secondary battery including the same. The cathode additive exhibits high irreversible capacity, and may be effectively applied to a battery using the anode material having high energy density

BACKGROUND

Recently, demand for secondary batteries as an energy source has been rapidly grown. Among the secondary batteries, lithium secondary batteries having high energy density and voltage, long cycle life and low self discharge rate have been commercialized and widely used.

Although graphite is mainly used as an anode material of the lithium secondary battery, it is difficult to increase the capacity of the lithium secondary battery, since the capacity per unit mass of the graphite is as small as 372 mAh/g. Accordingly, an anode material for forming an intermetallic compound with lithium, such as silicon, tin and oxides thereof, has been developed and used as a non-carbon anode material having an energy density higher than that of graphite in order to increase the capacity of the lithium secondary battery. However, although the non-carbon anode material has high capacity, an initial efficiency is low, which causes a large lithium consumption during the initial charge-discharge, and a large irreversible capacity loss.

In the related arts, a method of overcoming the irreversible capacity loss of the anode has been studied and proposed and involves using a material which can provide a lithium ion source or a storage material to the cathode material and which exhibits electrochemical activity after the first cycle so as not to deteriorate the performance of the entire battery. For instance, an oxide containing an excessive amount of lithium such as $Li_2NiO_2$ has been applied as a sacrificial cathode material or as an irreversible additive (or an overdischarge-preventing agent) to the cathode.

In recent years, as the anode material is further required to have high capacity, the irreversible additive is also required to have higher irreversible capacity. However, it has been difficult to develop a cathode additive having high irreversible capacity.

Existing irreversible additives such as $Li_2NiO_2$ are generally prepared by reacting nickel oxide or nickel carbonate with an excess amount of lithium oxide. However, at this time, by-products such as unreacted lithium oxide ($Li_2O$) not participating in the reaction remain in the finally produced irreversible additive, which may cause oxidation in a charging-discharging process to generate oxygen gas inside the battery. For reference, FIG. 1 schematically shows a mechanism by which oxygen gas is generated from unreacted lithium oxide. The oxygen gas thus generated may cause volume expansion and the like, which may be one of the main factors causing deterioration of battery performance In addition, the by-products such as lithium oxide may react with a binder component and the like in the preparation of a slurry composition for forming an electrode to cause an increase in viscosity or gelation of the composition. As a result, it is difficult to uniformly apply the electrode composition for forming an active material layer, and characteristics of the battery may be deteriorated.

Due to the above-mentioned problems, there is a continuing need for development of a cathode additive having high irreversible capacity with a small residual amount of by-products such as lithium oxide.

DETAILED DESCRIPTION

Technical Problem

The present disclosure is to provide a cathode additive of a lithium secondary battery having much higher irreversible capacity with a small residual amount of by-products such as lithium oxide, and a method for preparing the same.

The present disclosure is also directed to providing a cathode including the cathode additive as described herein.

The present disclosure is also directed to providing a lithium secondary battery including the cathode as described herein. The lithium secondary battery of the present disclosure may overcome the irreversible capacity loss of the anode material while exhibiting high capacity characteristics even with use of the anode material having high energy density.

Technical Solution

The present disclosure provides a cathode additive for a lithium secondary battery. In one embodiment, the cathode additive may include a compound represented by the following Chemical Formula 1:

$$y(Li_2Ni_{1-x}M_xO_2)\text{-}z(Li_6Co_{1-x}M_xO_4) \qquad \text{[Chemical Formula 1]}$$

in Chemical Formula 1,

M is one or more elements selected from the group consisting of P, B, F, W, Ti and Zr, 0≤x<1.0, y and z are molar ratios of $Li_2Ni_{1-x}M_xO_2$ and $Li_6Co_{1-x}M_xO_4$ contained in the compound of Chemical Formula 1, respectively, and y:z is 2:1 to 30:1.

The present disclosure also provides a method for preparing the cathode additive of a lithium secondary battery, including, in one embodiment of the method:

a first calcination step of calcining a mixture including a nickel precursor, an M-containing precursor, and a lithium precursor including $Li_2O$ to form a complex including $Li_2Ni_{1-x}M_xO_2$ and $Li_2O$; and a second calcination step of further reacting the lithium precursor contained in the complex with a cobalt (Co) precursor to form a compound of Chemical Formula 1.

In another embodiment, the present disclosure also provides a cathode mix including the cathode additive as described herein; and a cathode active material.

In yet another embodiment, the present disclosure also provides a lithium secondary battery including: a cathode including the cathode mix as described herein; an electrolyte; and an anode.

Hereinafter, the cathode additive according to one embodiment of the present disclosure, a method for preparing the same, and the like will be described in detail. Unless otherwise defined in this specification, all the technical and scientific terms used herein have the same meanings as what are generally understood by a person skilled in the related art to which the present invention belongs. In addition, repeated descriptions of the same technical configurations and operations as in the prior art are omitted for clarity.

In this disclosure, the term "on" that is used to designate a position of one element with respect to another element includes both a case that the one element is adjacent to the other element and a case that any other element exists between these two elements.

In this disclosure, when a part "comprises or includes" a component, the part does not exclude other components, but may comprise or include other components unless context states otherwise.

In this disclosure, the term "about or approximately" or "substantially" is intended to have meanings close to numerical values or ranges specified with an allowable error and intended to prevent accurate or absolute numerical values disclosed herein for understanding of the present invention from being illegally or unfairly used by any unconscionable third party.

According to an embodiment of the present disclosure, provided is a cathode additive for a lithium secondary battery, including a compound represented by the following Chemical Formula 1:

$$y(Li_2Ni_{1-x}M_xO_2)\text{-}z(Li_6Co_{1-x}M_xO_4) \qquad \text{[Chemical Formula 1]}$$

in Chemical Formula 1,

M is one or more elements selected from the group consisting of P, B, F, W, Ti and Zr, 0≤x<1.0, y and z are molar ratios of $Li_2Ni_{1-x}M_xO_2$ and $Li_6Co_{1-x}M_xO_4$ contained in the compound of Chemical Formula 1, respectively, and y:z is 2:1 to 30:1.

The cathode additive of this embodiment refers to a novel complex prepared by forming $Li_2Ni_{1-x}M_xO_2$ which can act as an irreversible additive, and then further calcining and reacting by-products of unreacted lithium oxide ($Li_2O$) with a cobalt (Co) precursor which were created during this first reaction forming the $Li_2Ni_{1-x}M_xO_2$. This further calcining and reacting of the by-products forms $Li_6Co_{1-x}M_xO_4$. As such, this novel complex, including both the $Li_2Ni_{1-x}M_xO_2$ and $Li_6Co_{1-x}M_xO_4$, are combined together to form a single particulate or a complex.

The "a single particulate or a complex" is meant to include a particle ("secondary particle") that may be formed by particles ("primary particle(s)") of each component, namely, the $Li_2Ni_{1-x}M_xO_2$ and $Li_6Co_{1-x}M_xO_4$.

The cathode additive of the embodiment may have a significantly reduced residual amount of by-products (e.g., $Li_2O$), as compared with previously known irreversible cathode additives such as $Li_2NiO_2$. For example, the compound of Chemical Formula 1 may further include the residual $Li_2O$ in an amount of about 1.5 wt % or less, more specifically 0 to about 1.0 wt %, or even more specifically about 0.0001 to about 0.6 wt %.

The reduction in the residual amount of by-products is due to the additional reaction of lithium oxide with the cobalt precursor. As a result, the cathode additive of this embodiment may significantly reduce generation of oxygen gas in the battery or gelation of the electrode slurry composition due to the existence of the by-products of lithium oxide and the like in the resulting battery.

Further, the $Li_6Co_{1-x}M_xO_4$ (e.g., $Li_6CoO_4$) formed by further reacting the lithium oxide may itself act as a lithium ion source as it may include an excessive amount of lithium, and in this fashion could thus act as an irreversible cathode additive. Accordingly, the inclusion of the cathode additive of this embodiment could have the additional benefit of significantly increasing the irreversible capacity than previously known irreversible additives.

For example, $Li_2NiO_2$ encompassed by $Li_2Ni_{1-x}M_xO_2$ may have a capacity of 390 mAh/g and $Li_6CoO_4$ encompassed by $Li_6Co_{1-x}M_xO_4$ may have a capacity of 700 mAh/g. Therefore, the cathode additive of this exemplary embodiment in which these two components form a single particulate or a complex may have much higher irreversible capacity than conventional $Li_2NiO_2$ depending on the molar ratio of these two components. Accordingly, the cathode additive of the embodiment may be suitably used for a high capacity lithium secondary battery by minimizing problems caused by by-products and providing high irreversible capacity in response to high capacity of the anode material.

In one exemplary method of analysis, X-Ray Diffraction (XRD) may be used to confirm that the cathode additive includes $Li_2Ni_{1-x}M_xO_2$ and $Li_6Co_{1-x}M_xO_4$ in the form of a single particulate or a complex, whereby XRD analysis examines the cathode additive in the form of a single secondary particle using Cu Kα X-ray (X-rα). For instance, the XRD analysis results of this example are shown in FIG. 4. Referring to FIG. 4, the XRD analysis result (the upper graph) of the cathode additive of one embodiment may have a peak derived from $Li_6Co_{1-x}M_xO_4$, for example $Li_6CoO_4$, at 2θ of 23.5°±0.2° or 36.3°±0.2°. This peak is compared with the XRD analysis result (the lower graph) of $Li_2Ni_{1-x}M_xO_2$, for example, $Li_2NiO_2$, which may have a peak having an intensity of 10% or less, more than 0 and 10% or less, 0.1 to 7%, or 0.2 to 5%, based on an intensity of the peak derived from $Li_2Ni_{1-x}M_xO_2$, for example, a peak at 2θ of 25.67°±0.2°.

Also, the content of $Li_6Co_{1-x}M_xO_4$ contained in the cathode additive of the embodiment, for example, a molar ratio of $Li_2Ni_{1-x}M_xO_2$ and $Li_6Co_{1-x}M_xO_4$ contained in the Chemical Formula 1, more specifically, a molar ratio of y:z may be calculated by analyzing a relative intensity of the peak.

The compound of Chemical Formula 1 contained in the cathode additive of the embodiment may include $Li_2Ni_{1-x}M_xO_2$ and $Li_6Co_{1-x}M_xO_4$ in a molar ratio y:z of 2:1 to 30:1, 2.5:1 to 20:1, or 3:1 to 10:1. For reference, specific contents of these two components may be calculated from a remaining content excluding a trace amount of $Li_2O$, and the molar ratio of y:z above.

By satisfying the content range of each component, the cathode additive of the embodiment may be prepared easily and effectively, and can reduce generation of oxygen gas or gelation of an electrode slurry composition due to by-products of the lithium oxide, while having high irreversible capacity.

In the cathode additive of Chemical Formula 1, the element M may improve thermal stability and structural stability by substituting a part of nickel or cobalt of each component. Specifically, the element M may be selected from the group consisting of a transition metal such as W, Ti, or Zr; and P, F and B. Preferably, the element M may suitably be P or B which are excellent in reactivity with lithium and capable of forming a more stable compound.

This element M may be added in a ratio that x is 0 or more and less than 1, 0 to 0.6, 0.001 to 0.5, 0.01 to 0.4, or 0.02 to 0.1, by substituting a part of nickel or cobalt of Chemical Formula 1. By satisfying the substitution ratio, stability of the compound for the cathode additive of Chemical Formula 1 may be improved, and the cathode additive of the Chemical Formula 1 may exhibit excellent irreversible capacity and the like.

The cathode additive may be mixed with a separate cathode active material and used as an irreversible cathode additive. In addition, the cathode additive may act as a cathode active material in itself after serving as an irreversible additive by providing excessive lithium ions in the initial charge-discharge process. The cathode additive of the embodiment may have high (irreversible) capacity, for example, greater than 390 mAh/g and less than 700 mAh/g as compared with conventional $Li_2NiO_2$, and the residual amount of by-products of lithium oxide may be greatly reduced, thereby suppressing deterioration of battery performance due to generation of oxygen gas, or gelation of an electrode slurry composition.

According to another embodiment of the present disclosure, provided is a method for preparing the cathode additive of a lithium secondary battery. This method may include a first calcination step of calcining a mixture including a nickel precursor, an M-containing precursor, and a lithium precursor including $Li_2O$ to form a complex including $Li_2Ni_{1-x}M_xO_2$ and $Li_2O$; and a second calcination step of further reacting the lithium precursor contained in the complex with a cobalt (Co) precursor to form a compound of Chemical Formula 1.

That is, according to the method of another embodiment, a nickel precursor, a lithium precursor containing $Li_2O$, and optionally an M-containing precursor may be first calcined and reacted to form $Li_2Ni_{1-x}M_xO_2$ (however, $Li_2O$ is included as an unreacted residual product), and then the lithium precursor such as lithium oxide ($Li_2O$) contained therein may be further reacted (secondary calcination) with a cobalt precursor (e.g., cobalt oxide (CoO) or cobalt hydroxide ($Co(OH)_2$)). As a result, at least a portion of the lithium precursor containing the unreacted lithium oxide is consumed, and $Li_6Co_{1-x}M_xO_4$ is formed by the reaction with the cobalt precursor, so that the cathode additive of Chemical Formula 1 according to one embodiment may be obtained.

In this manufacturing process, a portion of the M-containing precursor may remain following the first calcination step, and any such remaining M-containing precursor may optionally participate in the second calcination step, or, if necessary, an additional M-containing precursor (whether the same M-containing precursor or a different M-containing precursor) may be added in the second calcination step. In this case, M may selectively substitute for a part of cobalt in the $Li_6Co_{1-x}M_xO_4$.

Meanwhile, in the method of another embodiment described above, the first calcination step may be performed under an inert atmosphere at a temperature of 500 to 800° C., or 600 to 800° C., and the second calcination step may be performed under an inert atmosphere at a temperature of 400° C. to 800° C., or 500 to 700° C.

As the first calcination step proceeds under these reaction conditions, $Li_2Ni_{1-x}M_xO_2$ may be appropriately formed with a high yield. Also, as the second calcination step proceeds under these reaction conditions, for example, at a temperature of 800° C. or less, or 700° C. or less, it is possible to effectively form $Li_6Co_{1-x}M_xO_4$ and to form the cathode additive of the embodiment in the form of a single complex or the like without causing decomposition of the preformed $Li_2Ni_{1-x}M_xO_2$. These temperature ranges may have importance in the quality and yield of the resulting cathode additive. For instance, if the second calcination temperature is excessively high, $Li_2Ni_{1-x}M_xO_2$ may be decomposed, or $Li_6Co_{1-x}M_xO_4$ may not be formed properly, so that the cathode additive of the embodiment in the form of a single complex may not be formed properly.

The first and second calcination steps may suitably be carried out under an inert gas atmosphere including nitrogen, helium, or argon to reduce side reactions. Preferably, the calcination steps may be carried out under a nitrogen gas atmosphere to increase reaction efficiency and reduce side reactions.

In the preparation method, the nickel precursor may suitably include nickel-containing oxides or hydroxides such as nickel oxide (NiO) or nickel hydroxide ($Ni(OH)_2$).

In addition, the lithium precursor may further include another lithium precursor in addition to the above-described lithium oxide ($Li_2O$). However, since $Li_2Ni_{1-x}M_xO_2$ is unstable, the lithium precursor may be a compound having high reactivity similar to the lithium oxide ($Li_2O$).

The M-containing precursor, which includes an element M, may suitably include one or more selected from the group consisting its oxide, hydroxide, oxyhydroxide, sulfate, nitrate, acetate, carbonate, oxalate, citrate, halide, phosphate and hydrate thereof.

The cobalt precursor may suitably include cobalt-containing oxides or hydroxides such as cobalt oxide (CoO) or cobalt hydroxide ($Co(OH)_2$).

The lithium precursor, the nickel precursor, the M-containing precursor, and the cobalt precursor may suitably be selected and used by those skilled in the art in such an amount as to satisfy a composition ratio of each element of the Chemical Formula 1 to be finally prepared.

A sintering agent may be optionally added in the mixing of the raw materials described above. The sintering agent may suitably include a compound containing an ammonium ion such as $NH_4F$, $NH_4NO_3$, and $(NH_4)_2SO_4$; a metal oxide such as $B_2O_3$ and $Bi_2O_3$; or a metal halide such as $NiCl_2$ and $CaCl_2$, or a mixture of two or more thereof. The sintering agent may be used in an amount of 0.01 to 0.2 mol based on 1 mol of the nickel precursor. When it is used within the above range, sintering property may be improved, thereby improving the performance of the cathode material and preventing reduction of the initial capacity of the battery during a charge-discharge process.

In addition, a moisture removing agent may be optionally added in the mixing of the raw materials described above. The moisture removing agent may suitably include one or more of citric acid, tartaric acid, glycolic acid, and maleic acid. The moisture removing agent may be used in an amount of 0.01 to 0.2 mol based on 1 mol of the nickel precursor.

According to another embodiment of the present disclosure, provided is a cathode mix including the above-described cathode additive and a cathode active material.

Since the cathode additive of the embodiment is applied to the cathode mix, an initial irreversible capacity of the anode may be reduced compared with a conventional cathode without the cathode additive of the present disclosure, thereby increasing an initial efficiency of the cathode.

The cathode mix may suitably include the cathode additive: the cathode active material at a weight ratio of 1:99 to 35:65, 3:97 to 30:70, or 5:95 to 10:90. Within the above range, a synergistic effect of each component may be displayed.

When the cathode additive and the cathode active material are mixed in the above range, the initial irreversible capacity of the anode may be sufficiently reduced by the cathode additive in the initial charge-discharge (for example, in the first cycle) of the battery, and then reversible insertion and desorption of lithium ions may be stably performed by the cathode active material in the subsequent charge-discharge (for example, after the second cycle).

Except as described above, the cathode mix of the embodiment may suitably be prepared by methods well-known in the art. Hereinafter, the method well-known in the art is briefly mentioned, but this is merely an example, whereby the cathode mix of the above embodiment is not limited.

The cathode active material is not particularly limited, as long as it is a material capable of reversible insertion and desorption of lithium ions. For example, it may include one or more composite oxides of a metal selected from the group consisting of cobalt, manganese, nickel, and a combination thereof; and lithium.

For example, the cathode active material may be a compound represented by any one of the following formulae: $Li_aA_{1-b}R_bD_2$ (wherein, $0.90 \leq a \leq 1.8$ and $0 \leq b \leq 0.5$); $Li_aE_{1-b}R_bO_{2-c}D_c$ (wherein, $0.90 \leq a \leq 1.8$, $0 \leq b \leq 0.5$, and $0 \leq c \leq 0.05$); $LiE_{2-b}R_bO_{4-c}D_c$ (wherein, $0 \leq b \leq 0.5$, $0 \leq c \leq 0.05$); $Li_aNi_{1-b-c}Co_bR_cD_\alpha$ (wherein, $0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ (wherein, $0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ (wherein, $0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ (wherein, $0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ (wherein, $0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ (wherein, $0.90 \leq a \leq 1.8$, $0 \leq b \leq 0.5$, $0 \leq c \leq 0.05$ and $0 < \alpha < 2$); $Li_aNi_bE_cG_dO_2$ (wherein, $0.90 \leq a \leq 1.8$, $0 \leq b \leq 0.9$, $0 \leq c \leq 0.5$ and $0.001 \leq d \leq 0.1$); $Li_aNi_bCo_cMn_dGeO_2$ (wherein, $0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ (wherein, $0.90 \leq a \leq 1.8$ and $0.001 \leq b \leq 0.1$); $Li_aCoG_bO_2$ (wherein, $0.90 \leq a \leq 1.8$ and $0.001 \leq b \leq 0.1$); $Li_aMnG_bO_2$ (wherein, $0.90 \leq a \leq 1.8$ and $0.001 \leq b \leq 0.1$); $Li_aMn_2G_bO_4$ (wherein, $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; and $LiFePO_4$.

In the formulae above, A may be Ni, Co, Mn, or a combination thereof; R may be Al, Ni, Co, Mn, Cr, Fe, Mg, Sr, V, a rare earth element, or a combination thereof; D may be O F, S, P, or a combination thereof; E may be Co, Mn, or a combination thereof; Z may be F, S, P, or a combination thereof; G may be Al, Cr, Mn, Fe, Mg, La, Ce, Sr, V, or a combination thereof; Q may be Ti, Mo, Mn, or a combination thereof; T may be Cr, V, Fe, Sc, Y, or a combination thereof; J may be V, Cr, Mn, Co, Ni, Cu, or a combination thereof.

Of course, the compound listed above may include a coating layer on its surface, and may be used after mixing with a compound having a coating layer. The coating layer is a coating element compound, and may include oxide, hydroxide, oxyhydroxide, oxycarbonate, and hydroxycarbonate of the coating element. The compound for the coating layer may be amorphous or crystalline. The coating element for the coating layer may suitably include Mg, Al, Co, K, Na, Ca, Si, Ti, V, Sn, Ge, Ga, B, As, Zr, or a mixture thereof. The coating layer may be formed using any method that does not adversely affect the physical properties of the cathode active material (for example, a spray coating method or a dipping method), when the compound uses the above coating element. The coating methods may be well understood by those skilled in the art, and thus a detailed description thereof will be omitted.

The cathode mix may further include a conductive material, a binder, or a mixture thereof. The conductive material may improve conductivity of the electrode. The conductive material may have electrical conductivity without causing chemical changes in the battery. Examples of the conductive material may suitably include natural graphite, artificial graphite, carbon black, acetylene black, ketjen black, carbon fiber, metallic powders such as copper powder, nickel powder, aluminum powder and silver powder, metal fiber, and the like, and conductive materials such as polyphenylene derivatives may be used alone or in combination thereof.

The conductive material may suitably be added in an amount of 1 to 50 wt %, 3 to 30 wt %, or 7 to 20 wt % based on a total weight of the mix including the cathode active material and the cathode additive. Within the above range, the conductive material may enable appropriate formation of the cathode while imparting excellent electrical characteristics to the cathode.

The binder as used herein refers to a material for binding the cathode active material particles to each other and to attach the cathode active material to the current collector. Representative examples thereof may suitably include polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin and nylon, but are not limited thereto.

The binder may suitably be added in an amount of 1 to 50 wt %, 2 to 20 wt %, or 3 to 10 wt % based on a total weight of the mix including the cathode active material and the cathode additive. Within the above range, the binder may enable formation of a cathode having excellent durability without deteriorating the electrical characteristics and/or the capacity of the cathode.

In addition, a filler may be further added to the cathode mix, if necessary. The filler may be optionally used as a component to inhibit expansion of the cathode. The filler is not particularly limited as long as it is a fibrous material that does not cause chemical changes in the battery. For example, olefin-based polymers such as polyethylene and polypropylene; and fibrous materials such as glass fiber and carbon fiber may suitably be used.

According to another embodiment of the present disclosure, provided is a lithium secondary battery including a cathode including the above-described cathode mix; an electrolyte; and an anode.

Because the lithium secondary battery has the cathode including the cathode additive and the cathode active material, the initial irreversible capacity of the anode may decrease, the initial efficiency of the cathode may increase, performance deterioration due to oxygen gas during the operation may not occur, and energy density may not be deteriorated, thereby exhibiting excellent battery life.

Except for the cathode additive and the cathode mix described above, the lithium secondary battery of the embodiment may be generally prepared according to those well-known in the art. Hereinafter, the knowledge generally known in the art is briefly mentioned, but this is merely as an example, whereby the cathode mix of the above embodiment is not limited.

The cathode may include a cathode current collector; and a cathode mix layer disposed on the cathode current collector and including the cathode mix described above.

Specifically, the cathode may be prepared by applying a cathode mix, which is a mixture of a cathode active material, a cathode additive, a conductive material, and/or a binder, on a cathode current collector, followed by drying. The filler may be further added to the mixture, if necessary. Since the cathode mix has already been described above, a further explanation will be omitted.

The cathode current collector may suitably be formed to have a thickness of 3 to 500 μm. The cathode current collector is not particularly limited as long as it has high electrical conductivity without causing chemical changes in the battery. For example, the cathode current collector may suitably include stainless steel; aluminum; nickel; titan; sintered carbon; aluminum or stainless steel surface-treated with carbon, nickel, titan or silver; or the like. The current collector may form fine irregularities on its surface to increase adhesive force of the cathode active material, and various forms such as a film, a sheet, a foil, a net, a porous body, a foam body, and a nonwoven fabric body may be used.

In the lithium secondary battery of the present disclosure, the anode includes a current collector and an anode active material layer formed on the current collector, and the anode active material layer may include an anode active material.

The anode active material may suitably include one or more selected from the group consisting of a carbon-based anode active material, lithium metal, a lithium alloy, Si, $SiO_x$ (0<x<2), a Si—C composite, a Si—Q alloy (Q is an alkali metal, an alkaline earth metal, a Group 13 to Group 16 element, a transition metal, a rare earth element or a combination thereof, except Si), Sn, $SnO_2$, a Sn—C composite, a Sn—R alloy (R is an alkali metal, an alkaline earth metal, a Group 13 to Group 16 element, a transition metal, a rare earth element or a combination thereof, except Sn).

The anode current collector may suitably be formed to have a thickness of about 3 to 500 μm. The anode current collector is not particularly limited as long as it has electrical conductivity without causing chemical changes in the battery. For example, the anode current collector may suitably include one or more of copper; stainless steel; aluminum; nickel; titan; sintered carbon; copper or stainless steel surface-treated with carbon, nickel, titan or silver; an aluminum-cadmium alloy; or the like. Further, similarly to the cathode current collector, the anode current collector may form fine irregularities on its surface to increase adhesive force of the anode active material, and various forms such as a film, a sheet, a foil, a net, a porous body, a foam body, and a nonwoven fabric body may suitably be used.

The lithium secondary battery of the embodiment may be a lithium ion battery, a lithium ion polymer battery, or a lithium polymer battery depending on the type of the electrolyte and/or the separator.

When the lithium secondary battery is a lithium ion battery using a liquid electrolyte, the liquid electrolyte may be impregnated into the separator. The separator is interposed between the cathode and the anode, and an insulating thin film having high ion permeability and mechanical strength is used. The pore diameter of the separator may suitably range from 0.01 to 10 μm and the thickness may suitably range from 5 to 300 μm. The separator may suitably include a sheet or a nonwoven fabric made of an olefin-based polymer such as polypropylene, which is chemically resistant and hydrophobic, glass fiber, polyethylene, or the like. When a solid electrolyte such as a polymer is used as the electrolyte, the solid electrolyte may also serve as a separator.

The liquid electrolyte may be a non-aqueous electrolyte containing a lithium salt. The non-aqueous electrolyte containing a lithium salt may be composed of a non-aqueous electrolyte and lithium. Examples of the non-aqueous electrolyte may suitably include a non-aqueous organic solvent, an organic solid electrolyte, an inorganic solid electrolyte, and the like, but are not limited thereto.

Examples of the non-aqueous organic solvent may suitably include, but not be limited to, non-aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and the like.

Examples of the organic solid electrolyte may suitably include, but not be limited to, polyethylene derivatives, polyethylene oxide derivatives, polypropylene oxide derivatives, phosphoric acid ester polymers, polyagitation lysine, polyester sulfide, polyvinyl alcohols, polyvinylidene fluoride, polymers containing a secondary dissociation group, and the like.

Examples of the inorganic solid electrolyte may suitably include, but not be limited to, nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, and the like.

The lithium salt may be soluble in the non-aqueous electrolyte and examples thereof may suitably include, but not be limited to, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, lithium imide, and the like.

The non-aqueous electrolyte containing a lithium salt may suitably include, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like, in order to improve charge-discharge characteristics and flame retardancy, and the like. In some cases, a halogen-containing solvent such as carbon tetrachloride and ethylene trifluoride may be further added to give nonflammability, or carbon dioxide gas may be further added to improve high-temperature storage characteristics. Other additives, for example, FEC (Fluoro-Ethylene Carbonate), PRS (Propene sultone), and the like may be further added thereto.

The lithium salt such as $LiPF_6$, $LiCl_4$, $LiBF_4$, $LiN(SO_2CF_3)_2$, and the like may be added to a mixed solvent of a cyclic carbonate such as EC and PC, which is a high-dielectric solvent, and a linear carbonate such as DEC, DMC and EMC, which is a low-viscosity solvent, to prepare a non-aqueous electrolyte containing a lithium salt.

The lithium secondary battery according to another embodiment of the present disclosure may be implemented as a battery module including the same as a unit cell, a battery pack including the battery module, and a device including the battery pack as a power source.

Examples of the device may include an electric vehicle, a hybrid electric vehicle, a plug-in hybrid electric vehicle, or a power storage system, but not limited thereto.

Advantageous Effects

According to the present disclosure, a cathode additive may provide a lithium secondary battery having high irreversible capacity with a small residual amount of by-products such as lithium oxide.

The lithium secondary battery including the cathode additive may overcome the irreversible capacity loss of the anode material while exhibiting high capacity characteristics even with use of the anode material having high energy density. In addition, performance deterioration of the battery due to by-products may be reduced and excellent battery life and capacity may be achieved.

BRIEF DESCRIPTION OF THE DRAWINGS

FIG. 1 is a diagram schematically showing a mechanism by which oxygen gas is generated from unreacted lithium oxide in a conventional irreversible cathode additive.

FIG. 2 is a graph showing the XRD analysis result of the cathode. The cathode is separated from a battery obtained using the cathode additive prepared in Comparative Example 1 after charging the battery to a predetermined voltage.

FIG. 3 is a graph showing the XRD analysis result of the cathode. The cathode is separated from a battery obtained using the cathode additive prepared in Example 2 after charging the battery to a predetermined voltage.

FIG. 4 is a graph showing the XRD analysis result of the cathode additives obtained in Comparative Example 1 and Example 2.

FIG. 5 is a graph showing the charge-discharge profile of the cathode additives obtained in Example 2 and Comparative Example 1.

FIG. 6 is a graph showing the evaluation results of an amount of oxygen gas generated during storage after charging in Experimental Example 2 for the battery prepared by using the cathode additive obtained in Example 2 and Comparative Example 1 together with the cathode active material.

DETAILED DESCRIPTION OF THE EMBODIMENTS

Hereinafter, the function and effect of the present invention will be described in more detail through specific examples of the present invention. However, these examples are for illustrative purposes only, and the invention is not intended to be limited by these examples.

EXAMPLE 1

60 g of $Li_2O$ as a raw material for lithium, 150 g of NiO as a raw material of nickel and 6 g of ammonium phosphate as a raw material for element M were mixed, and then heat-treated and calcined at 685° C. for 18 hours under a nitrogen atmosphere.

Then, 5.13 g of CoO was further added to the product, followed by heat-treating and calcining at 550° C. for 18 hours under a nitrogen atmosphere. The product was cooled down to obtain cathode additive particles.

EXAMPLE 2

60 g of $Li_2O$ as a raw material for lithium, 150 g of NiO as a raw material of nickel and 6 g of ammonium phosphate as a raw material for element M were mixed, and then heat-treated and calcined at 685° C. for 18 hours under a nitrogen atmosphere.

Then, 15.4 g of CoO was further added to the product, followed by heat-treating and calcining at 550° C. for 18 hours under a nitrogen atmosphere. The product was cooled down to obtain cathode additive partic

EXAMPLE 3

60 g of $Li_2O$ as a raw material for lithium, 150 g of NiO as a raw material of nickel and 6 g of ammonium phosphate as a raw material for element M were mixed, and then heat-treated and calcined at 685° C. for 18 hours under a nitrogen atmosphere.

Then, 45 g of CoO was further added to the product, followed by heat-treating and calcining at 550° C. for 18 hours under a nitrogen atmosphere. The product was cooled down to obtain cathode additive particles.

EXAMPLE 4

60 g of $Li_2O$ as a raw material for lithium, 150 g of NiO as a raw material of nickel and 0.5 g of boric acid as a raw material for element M were mixed, and then heat-treated and calcined at 685° C. for 18 hours under a nitrogen atmosphere.

Then, 15.4 g of CoO was further added to the product, followed by heat-treating and calcining at 550° C. for 18 hours under a nitrogen atmosphere. The product was cooled down to obtain cathode additive particles.

COMPARATIVE EXAMPLE 1

60 g of $Li_2O$ as a raw material for lithium, 150 g of NiO as a raw material of nickel and 6 g of ammonium phosphate as a raw material for element M were mixed, and then heat-treated and calcined at 685° C. for 18 hours under a nitrogen atmosphere. The product was cooled down to obtain cathode additive particles.

EXPERIMENTAL EXAMPLE 1

Analysis of the Cathode Additive

X-ray diffraction (XRD) analysis using Cu Kα X-ray (X-rα) was performed on the cathode additive particles prepared in Example 2 and Comparative Example 1, and the result is shown in FIG. 4. For this XRD analysis, a XRD analysis equipment from Bruker (product name: D4 Endeavor) was used.

Referring to the upper graph of FIG. 4, it was confirmed that Example 2 had an additional peak at 2θ of 23.5°±0.2° or 36.3°±0.2°, and this additional peak had an intensity of 5%, based on an intensity of the peak at 2θ of 25.67°±0.2°. This result indicated that $Li_6Co_{1-x}M_xO_4$ was included in the cathode additive of Example 2, and the entire cathode additive had a single complex form.

A cathode was prepared using the cathode additive particles prepared in Example 2 and Comparative Example 1, and then X-ray diffraction (XRD) analysis was performed at various voltages. The results are shown in FIG. 2 and FIG. 3, respectively.

Specifically, the cathode additive prepared in Example 2 or Comparative Example 1, a carbon black conductive material and a PVdF binder were mixed in a weight ratio of 85:10:5 in N-methylpyrrolidone solvent to prepare a composition for forming a cathode. This composition was applied to an aluminum current collector, followed by drying and rolling. Li-metal was used as an anode, and a coin-cell type battery was manufactured using an electrolyte containing 1.0 M of $LiPF_6$ in a solvent having a mixing volume ratio of EC:DMC:DEC to be 1:2:1.

The prepared battery was charged to a predetermined voltage shown in FIG. 2 and FIG. 3 at 0.1C and a temperature of 25° C., and then the cathode was separated and subjected to XRD analysis.

Referring to FIG. 2 and FIG. 3, it was confirmed that Comparative Example 1 had a clear peak of unreacted lithium oxide ($Li_2O$), so that a relatively large amount of by-products were contained (see FIG. 2; greater than 1.5 wt %). On the other hand, in Example 2, the peak of unreacted lithium oxide ($Li_2O$) was substantially absent and the content of by-products was minimized to 1.5 wt % or less, more specifically, 0.6 wt % or less (see FIG. 3).

The composition of the cathode additives of the Examples and Comparative Example was quantitatively calculated from the XRD results, and the results are shown in Table 1 below.

TABLE 1

| | The molar ratio of $Li_2Ni_{1-x}M_xO_2$:$Li_6Co_{1-x}M_xO_4$ (y:z) | Type of M and the content (x) |
| --- | --- | --- |
| Example 1 | 3:1 | P(x = 0.07) |
| Example 2 | 9:1 | P(x = 0.07) |
| Example 3 | 27:1 | P(x = 0.07) |
| Example 4 | 9:1 | B(x = 0.07) |
| Comparative Example 1 | 1:0 | P(x = 0.07) |

Referring to Table 1 above, it was confirmed that the cathode additives of Examples 1 to 4 satisfy the composition of Chemical Formula 1.

Meanwhile, the cathode additive prepared in Example 2 or Comparative Example 1, an acetylene black conductive material and a PVdF binder were mixed in a weight ratio of 85:10:5 in N-methylpyrrolidone solvent to prepare a composition for forming a cathode of each exemplary additive. This composition was applied to an aluminum current collector, followed by drying and rolling. A Li-metal anode and a PE separator were used to manufacture a coin half-cell type battery.

The battery was charged to 4.25 V, and then discharged to 2.5V to obtain a charge-discharge profile. This is shown in FIG. 5.

Referring to FIG. 5, it was confirmed that the cathode additive of Example 2 exhibited higher irreversible capacity (greater than 400 mAh/g) than Comparative Example 1 (about 375 mAh/g).

EXPERIMENTAL EXAMPLE 3

Evaluation of Oxygen Gas Generation

The cathode additive prepared in Example 2 or Comparative Example 1, a cathode active material of $Li(Ni_{0.8}Co_{0.1}Mn_{0.1})O_2$, an acetylene black conductive material and a PVdF binder were mixed in a weight ratio of 5:80:10:5 in N-methylpyrrolidone solvent to prepare a composition for forming a cathode from each additive. These compositions were each applied to an aluminum current collector, followed by drying and rolling to prepare a cathode of each additive. A Li-metal anode and a PE separator were used to manufacture a coin half-cell type battery of each cathode.

The battery was charged to 4.25 V and stored at 60° C. for 6 weeks. In this experiment, the amount of generated oxygen gas when using the additive of Example 2 and Comparative Example 1 was evaluated using a volumetric method with the principle of Archimedes. The results are shown in FIG. 6.

Referring to FIG. 6, it was confirmed that the amount of oxygen gas generated during storage after charging was reduced in the case of using the cathode additive of Example 2, compared with the case of using the cathode additive of Comparative Example 1 (Example 2: about 4.2 cm³ after 6 weeks of storage, versus Comparative Example 1: about 6.0 cm³ after 6 weeks of storage). This is presumably because the amount of by-products such as lithium oxide ($Li_2O$) was reduced in the cathode additive of Example 2, thereby reducing the amount of generated oxygen gas derived therefrom.

The invention claimed is:

1. A cathode additive for a lithium secondary battery, comprising:
a compound represented by the following Chemical Formula 1:

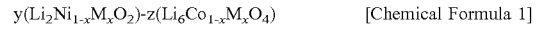

$$y(Li_2Ni_{1-x}M_xO_2)\text{-}z(Li_6Co_{1-x}M_xO_4) \quad \text{[Chemical Formula 1]}$$

in Chemical Formula 1,
M is one or more elements selected from the group consisting of P, B, F, W, Ti and Zr,
$0 \leq x < 1.0$,
y and z are molar ratios of $Li_2Ni_{1-x}M_xO_2$ and $Li_6Co_{1-x}M_xO_4$ contained in the compound of Chemical Formula 1, and y:z is 2:1 to 30:1.

2. The cathode additive for a lithium secondary battery of claim 1,
wherein the compound comprises primary particles of $Li_2Ni_{1-x}M_xO_2$ and primary particles of $Li_6Co_{1-x}M_xO_4$ physically mixed and connected to form a single particulate or a complex.

3. The cathode additive for a lithium secondary battery of claim 2,
wherein the compound of Chemical Formula 1 in the form of a single particulate or a complex has an additional peak at 2θ of 23.5°±0.2° or 36.3°±0.2° in XRD (X-ray diffraction) analysis by Cu Kα X-ray (X-rα), and an intensity of the additional peak is 10% or less based on an intensity of the peak at 2θ of 25. 67°±0.2°.

4. The cathode additive for a lithium secondary battery of claim 1,
wherein the compound of Chemical Formula 1 further comprises residual $Li_2O$ in an amount of about 1.5 wt % or less.

5. The cathode additive for a lithium secondary battery of claim 1,
wherein the ($Li_2Ni_{1-x}M_xO_2$) is $Li_2NiO_2$ and the ($Li_6Co_{1-x}M_xO_4$) is $Li_6CoO_4$.

6. The cathode additive for a lithium secondary battery of claim 1,
wherein y:z is 2.5:1 to 20:1.

7. The cathode additive for a lithium secondary battery of claim 1,
wherein y:z is 3:1 to 10:1.

8. A method for preparing the cathode additive of a lithium secondary battery of claim 1, comprising:
a first calcination step of calcining a mixture comprising a nickel precursor, an M-containing precursor, and a lithium precursor comprising $Li_2O$ to form a complex comprising $Li_2Ni_{1-x}M_xO_2$ and $Li_2O$; and
a second calcination step of further reacting the lithium precursor contained in the complex with a cobalt (Co) precursor to form a compound of Chemical Formula 1.

9. The method for preparing the cathode additive of claim 8,
wherein the first calcination step is carried out under an inert atmosphere at a temperature of 500° C. to 800° C., and
the second calcination step is carried out under an inert atmosphere at a temperature of 400° C. to 800° C.

10. The method for preparing the cathode additive of claim 8,
wherein the nickel precursor comprises nickel oxide or nickel hydroxide, and
the M-containing precursor, which includes the element M, comprises one or more selected from the group consisting of its oxide, hydroxide, oxyhydroxide, sulfate, nitrate, acetate, carbonate, oxalate, citrate, halide, phosphate and hydrate thereof.

11. A cathode mix comprising the cathode additive of claim 1; and a cathode active material.

12. The cathode mix of claim 11,
wherein a weight ratio of the cathode additive: the cathode active material is 1:99 to 35:65.

13. The cathode mix of claim 11,
wherein the cathode active material comprises one or more composite oxides of a metal selected from the group consisting of cobalt, manganese, nickel, and a combination thereof; and lithium.

14. A lithium secondary battery comprising: a cathode comprising the cathode mix of claim 11; an electrolyte; and an anode.

* * * * *